Jan. 23, 1934.  E. COWLES  1,944,836
APPARATUS FOR DISSEMINATING SOLIDS IN LIQUIDS
Filed March 29, 1933  2 Sheets-Sheet 1

INVENTOR-
Edwin Cowles
BY
ATTORNEY-

Jan. 23, 1934.  E. COWLES  1,944,836
APPARATUS FOR DISSEMINATING SOLIDS IN LIQUIDS
Filed March 29, 1933  2 Sheets-Sheet 2
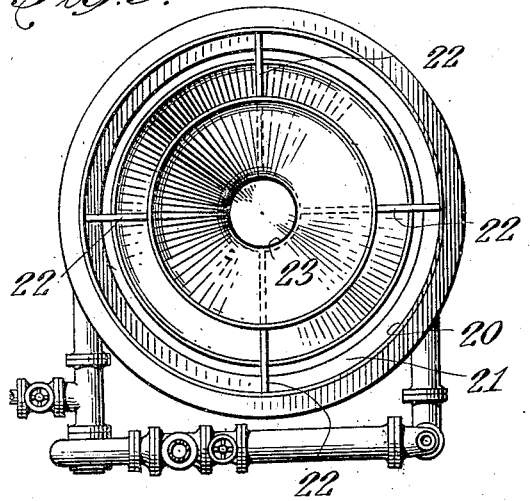
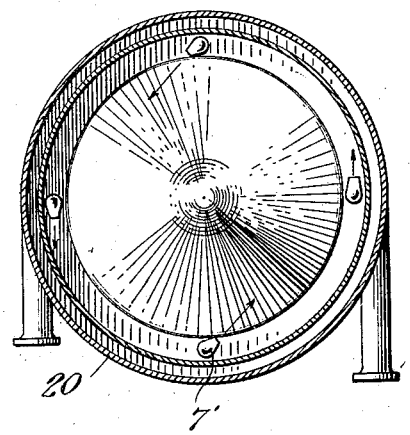
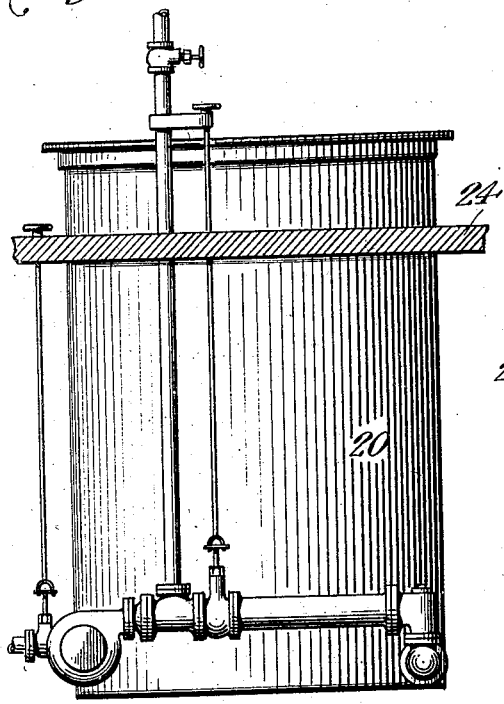
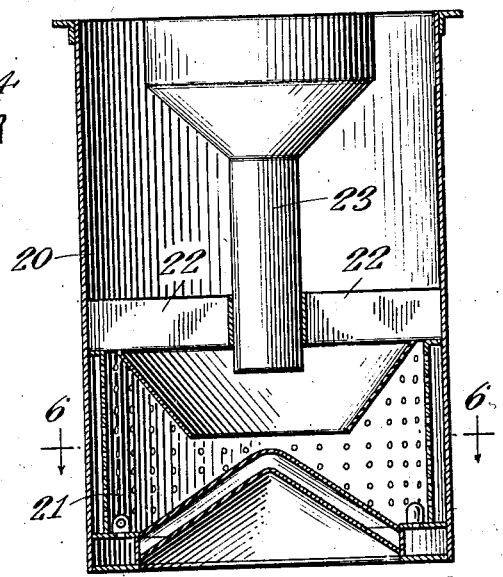

Patented Jan. 23, 1934

1,944,836

UNITED STATES PATENT OFFICE

1,944,836

APPARATUS FOR DISSEMINATING SOLIDS IN LIQUIDS

Edwin Cowles, Princeton, N. J., assignor to Cowles Engineering Corporation, Sewaren, N. J., a corporation of New Jersey Application March 29, 1933. Serial No. 663,292

10 Claims. (Cl. 92—20)

This invention relates to apparatus for disseminating solids in liquids. In my prior Patent No. 1,883,597 I have described a process and apparatus for accomplishing this purpose, and the present invention is an improvement thereon.

It is an object of the present invention to improve the efficiency of the machine, and to provide a machine which is better adapted for certain purposes.

Other objects and advantages of the invention will appear hereinafter.

A preferred embodiment of the invention selected for purposes of illustration is shown in the accompanying drawings, in which, Figure 1 is a top plan view.

Figure 5 is a top plan view of a modified form of apparatus.

Figure 6 is a section on the line 6—6 of Figure 8.

Figure 7 is a front elevation.

Figure 8 is a section on the line 8—8 of Figure 5.

Figure 1:
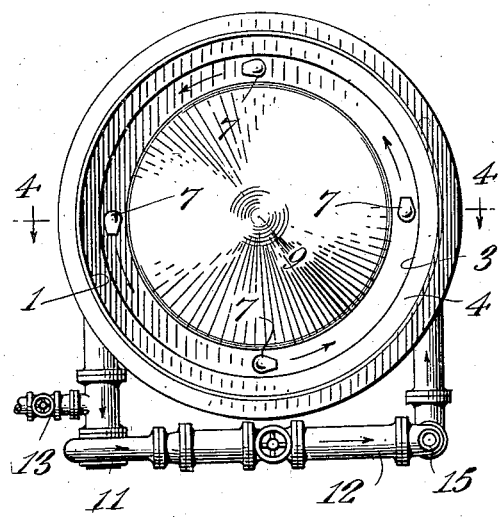
Figure 2:
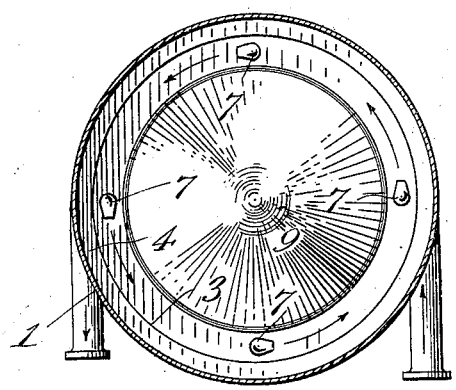
Figure 2 is a section on the line 2—2 of Figure 4.
Figure 3:
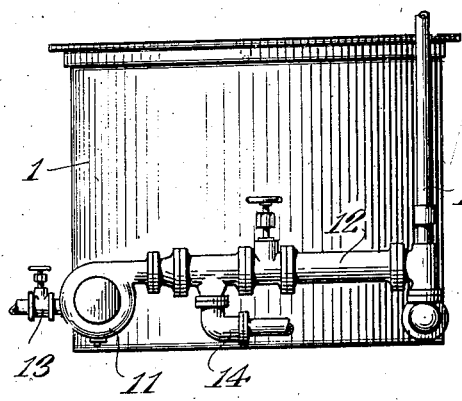
Figure 3 is a front elevation.
Figure 4:
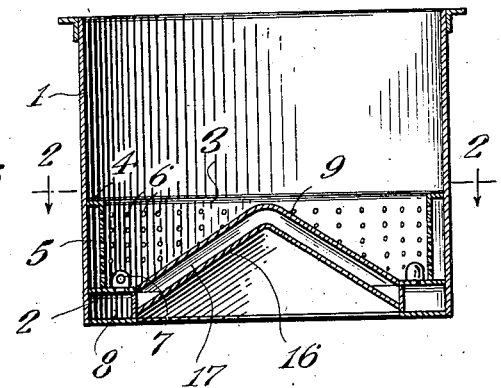
Figure 4 is a section on the line 4—4 of Figure 1.

Referring to the drawings, and particularly to Figures 1, 2, 3 and 4, the apparatus comprises a container 1 which is preferably substantially cylindrical in shape, with the cylinder standing on end so that its axis is substantially vertical. The bottom of the cylinder is closed by bottom plate 2.

Located within the container is a partition 3, also preferably cylindrical in shape, the said partition being spaced from the walls of the container, as by the flange 4, in order to provide a chamber 5 between the partition and the container walls. The partition 3 is provided with a multiplicity of apertures or perforations 6 which serve to permit flow of liquid and disseminated solids therethrough.

A plurality of nozzles 7 intended to produce the disintegrating jets of liquid, as described in my aforementioned patent, are located in suitable positions to direct the said jets across the apertures in the partition for purposes also explained in the said patent. These nozzles may be conveniently mounted on the bottom plate 2 in such manner as to communicate with an annular passageway or header 8 located beneath the bottom plate.

Means are provided for directing the solid material which is to be disintegrated and disseminated in the liquid toward the bottom of the apertured partition to a point where the said solid material may be brought into the area of most effective action of the liquid jets. A simple and effective method of accomplishing this result without the use of moving parts is to form the bottom plate in the shape of a cone 9 having its base extending into close proximity to the bottom of the apertured partition, and having its apex extending into the area encompassed by the said apertured partition. As will be observed, solid material which is introduced into the container will tend to slide down the inclined walls of the cone toward the apertured partition and into the area where the jet action is most effective.

The pump 11 is provided having its discharge side connected to the nozzles 7 through a suitable conduit, as for example, the pipe 12 which is connected by suitable connections to the header 8. The intake side of the said pump is connected to the chamber 5. Other connections may be provided if desired, as for example, inlet connection 13 through which additional liquid may be admitted to the system and outlet connection 14 through which liquid and disseminated solid may be withdrawn from the system. If desired, a steam connection 15 may be provided in case it is desirable to heat the contents of the container. If it is desired to apply heat externally, the double bottom 16 may be provided so as to form a chamber 17 to which steam may be supplied.

The operation of the apparatus in carrying out the process of the aforementioned patent will be apparent. The pump 11 causes a circulation of liquid in the direction indicated by the arrows and the nozzles 7 are designed to provide relatively high velocity jets which rapidly disintegrate solid material which is charged into the container. As explained in the aforementioned patent, the jets not only perform a disintegrating function, but they also continuously sweep the apertures in the partition 3, thus keeping the apertures clear so as to permit liquid and disseminated solids to flow therethrough. As previously pointed out, the cone-shaped bottom causes the solids to move into the area of the jets where the most effective disintegrating action takes place.

The principle of operation of the modified form of apparatus shown in Figures 5, 6, 7 and 8 is essentially the same as that illustrated in Figures 1, 2, 3 and 4, but it has been found desirable in operating upon certain types of material to increase the height of the container in order to provide a still chamber 20 above the operating chamber 21. In order to prevent the contents of the still chamber from rotating with the contents of the operating chamber, a set of baffle plates 22 are provided which maintain the contents of the still chamber in relatively quiet condition. This has the effect of permitting pieces of solid material to settle by gravity into the operating chamber where they may be further subjected to disintegrating action.

In cases where such a still chamber is provided it is sometimes also desirable to provide a charging tube 23 which delivers the solids directly into the operating chamber and onto said cone 9 without disturbing the contents of the still chamber.

If desired, one or more of the nozzles 7' as illustrated in Figure 6 may be directed differently from the remaining nozzles in order to create currents of liquid for special purposes such as dislodging lumps or cakes of material which may tend to stick to the cone 9.

In Figure 7 an arrangement of the machine below the level of the floor 24 is suggested so as to provide convenient access for charging the machine and also convenient access to the valves for controlling the operation of the machine.

It will be understood that the invention may be variously modified and embodied within the scope of the subjoined claims.

I claim as my invention:

1. In an apparatus for the dissemination of solids in liquids, a container, a substantially cylindrical partition therein spaced from the container to provide a chamber therebetween, said partition having apertures therein to permit flow of liquid and disseminated solid therethrough, a bottom for said cylindrical container having a conical portion, the base of which extends into close proximity to the apertured partition, and the apex of which extends into the area encompassed by the said apertured partition, a nozzle located between said conical portion and said apertured partition, and mounted to direct a jet of liquid internally substantially tangent to said cylindrical partition, a pump, a conduit from the discharge side of said pump to said nozzle, and a conduit from the intake side of said pump to said chamber.

2. In an apparatus for the dissemination of solids in liquids, a container, a substantially cylindrical partition therein spaced from the container to provide a chamber therebetween, said partition having apertures therein to permit flow of liquid and disseminated solid therethrough, a bottom for said cylindrical container having a conical portion, the base of which extends into close proximity to the apertured partition, and the apex of which extends into the area encompassed by the said apertured partition, a nozzle located between said conical portion and said apertured partition, a pump, a conduit from the discharge side of said pump to said nozzle, and a conduit from the intake side of said pump to said chamber.

3. In an apparatus for the dissemination of solids in liquids, a container, a substantially cylindrical partition therein spaced from the container to provide a chamber therebetween, said partition having apertures therein to permit flow of liquid and disseminated solid therethrough, means at the bottom of said container to direct solid material toward said apertured partition, a nozzle located in the area toward which said solid material is directed, and mounted to direct a jet of liquid internally substantially tangent to said cylindrical partition, a pump, a conduit from the discharge side of said pump to said nozzle, and a conduit from the intake side of said pump to said chamber.

4. In an apparatus for the dissemination of solids in liquids, a container, a substantially cylindrical partition therein spaced from the container to provide a chamber therebetween, said partition having apertures therein to permit flow of liquid and disseminated solid therethrough, means at the bottom of said container to direct solid material toward said apertured partition, a nozzle located in the area toward which said solid material is directed, a pump, a conduit from the discharge side of said pump to said nozzle, and a conduit from the intake side of said pump to said chamber.

5. In an apparatus for the dissemination of solids in liquids, a container, a substantially cylindrical partition therein spaced from the container to provide a chamber therebetween, said partition having apertures therein to permit flow of liquid and disseminated solid therethrough, a bottom for said cylindrical container having a conical portion, the base of which extends into close proximity to the apertured partition, and the apex of which extends into the area encompassed by the said apertured partition, a plurality of nozzles located between said conical portion and said apertured partition, an annular passageway connected to said nozzles, a pump, a conduit from the discharge side of said pump to said passageway, and a conduit from the intake side of said pump to said chamber.

6. In an apparatus for the dissemination of solids in liquids, a container, a substantially cylindrical partition therein spaced from the container to provide a chamber therebetween, said partition having apertures therein to permit flow of liquid and disseminated solid therethrough, means at the bottom of said container to direct solid material toward said apertured partition, a plurality of nozzles located in the area toward which said solid material is directed, a passageway connected to said nozzles, a pump, a conduit from the discharge side of said pump to said passageway, and a conduit from the intake side of said pump to said chamber.

7. In an apparatus for the dissemination of solids in liquids, a container, a partition therein spaced from the wall of the container to provide a chamber therebetween, said partition having apertures therein to permit flow of liquid and disseminated solid therethrough, means at the bottom of said container to direct solid material toward said apertured partition, a nozzle located in the area toward which said solid material is directed and mounted to direct a jet of liquid across said apertured partition, a pump, a conduit from the discharge side of said pump to said nozzle, and a conduit from the intake side of said pump to said chamber.

8. In an apparatus for the dissemination of solids in liquids, a container, a partition therein spaced from the wall of the container to provide a chamber therebetween, said partition having apertures therein to permit flow of liquid and disseminated solid therethrough, means at the bottom of said container to direct solid material toward said apertured partition, a nozzle located in the area toward which said solid material is directed, a pump, a conduit from the discharge side of said pump to said nozzle, and a conduit from the intake side of said pump to said chamber.

9. In an apparatus for the dissemination of solids in liquids, a container, a partition in the lower part of the container and spaced from the wall thereof to provide a chamber therebetween, said partition having apertures therein to permit flow of liquid and disseminated solid therethrough, means at the bottom of said container to direct solid material toward said apertured partition, means located above said partition to retard circulation of liquid in that portion of the container above said partition, a pump, a conduit from the discharge side of said pump to said nozzle, and a conduit from the intake side of said pump to said chamber.

10. In an apparatus for the dissemination of solids in liquids, a container, a partition in the lower part of the container and spaced from the wall thereof to provide a chamber therebetween, said partition having apertures therein to permit flow of liquid and disseminated solid therethrough, means at the bottom of said container to direct solid material toward said apertured partition, means located above said partition to retard circulation of liquid in that portion of the container above said partition, a charging tube extending through the upper portion of the container to discharge solid material onto said directing means, a pump, a conduit from the discharge side of said pump to said nozzle, and a conduit from the intake side of said pump to said chamber.

EDWIN COWLES.